J. JOHNSON,
Assignor, by mesne assignments, to B. H. VELLINES.
Machine for Cleaning Grain, Nuts, &c.
No. 8,749. Reissued June 10, 1879.
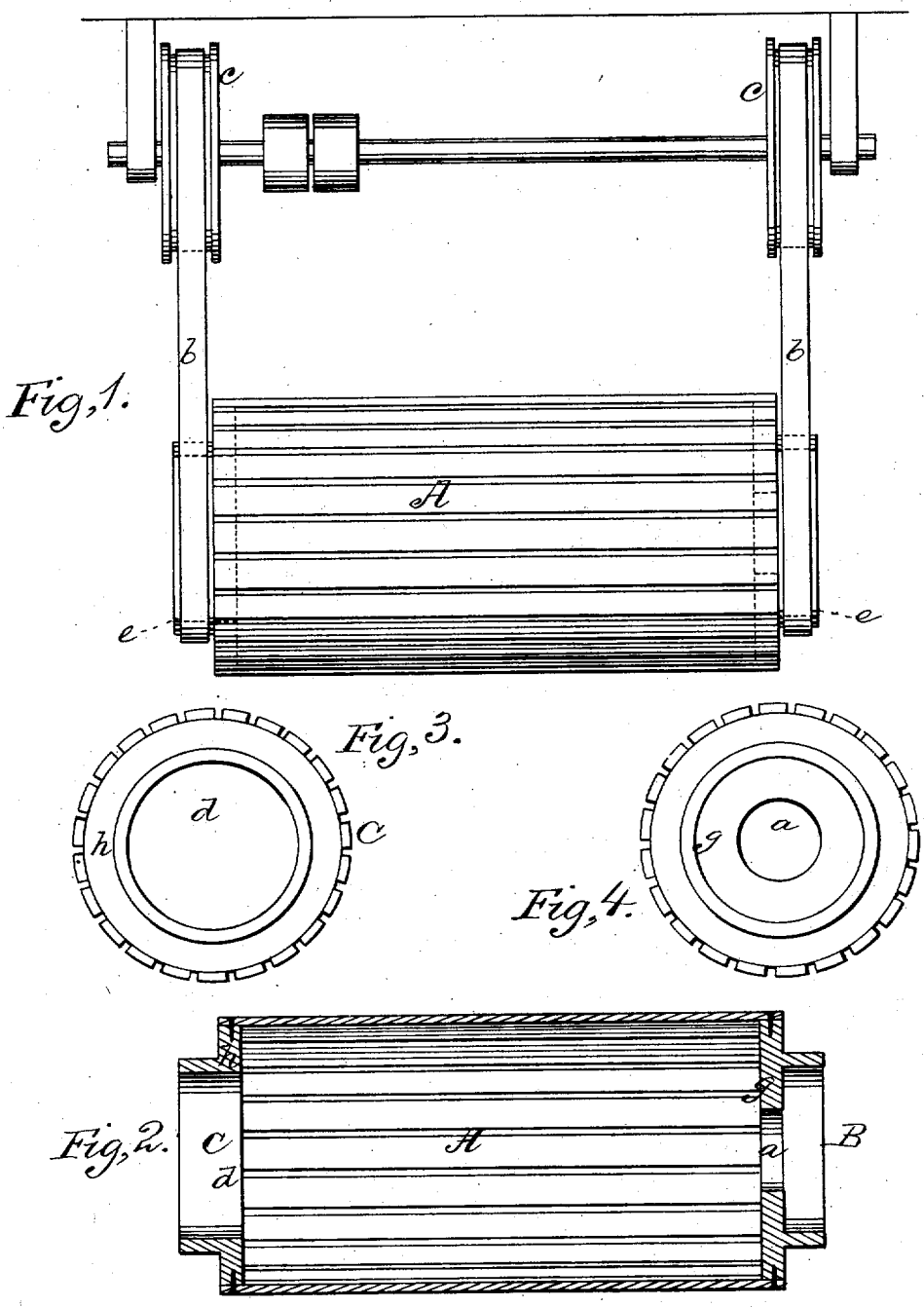
WITNESSES
Villette Anderson.
F. J. Masi.
INVENTOR
Josee Johnson,
by E. W. Anderson.
ATTORNEY
N. PETERS, PHOTO-LITHOGRAPHER, WASHINGTON, D. C.

UNITED STATES PATENT OFFICE.

JOSEE JOHNSON, OF NEW LEBANON, NEW YORK, ASSIGNOR, BY MESNE ASSIGNMENTS, TO BENTON H. VELLINES.

IMPROVEMENT IN MACHINES FOR CLEANING GRAIN, NUTS, &c.

Specification forming part of Letters Patent No. 139,248, dated May 27, 1873; Reissue No. 8,749, dated June 10, 1879; application filed October 7, 1878.

*To all whom it may concern:*

Be it known that I, JOSEE JOHNSON, of New Lebanon, in the county of Columbia and State of New York, have invented an Improved Cylinder Machine for Cleaning Seed, Grain, Nuts, Fruit, Castings, and other articles, which is clearly and fully explained in the following specification, taken in connection with the drawings forming part thereof, in which similar letters indicate like parts in the several figures.

My invention relates especially to horizontal rotary cleaners; and it consists in the construction and novel arrangement of an end-feeding and overflow end-discharging cylinder, having central feed and discharge openings, bounded by inwardly-projecting annular end flanges, whereby the material is cleaned and automatically discharged by overflow at one end, all as hereinafter shown and described.

Referring to the accompanying drawings, Figure 1 represents a side view, showing the cylinder in suspending-belts. Fig. 2 is a sectional view, showing the different diameters of the feed and discharge openings. Figs. 3 and 4 are end views of the cylinder-heads.

The letter A designates the cylinder, the side wall, *b*, of which, may be constructed with slats or staves, with or without open spaces between the same; or the cylinder may be made of wire-cloth stretched over a suitable frame, and slats in either case may be attached to the inner side of the cylinder to run either longitudinally or diagonally, each mode being especially adapted for particular purposes.

When the cylinder is of any great length a hoop may surround its center to give it proper strength and support.

The entrance-head B is provided with the central feed-opening, *a*, and the other head, C, with the discharge-opening *d*, also centrally arranged, and of larger diameter than the feed-opening *a*, referred to.

In suspending a cylinder, rims or bearings *e e*, affixed to the ends thereof, serve as pulleys, around which pass endless belts *b b*, which extend over the double-flanged pulleys *c c*, located over said rims or bearings.

As the cylinder-heads B C are of the same diameter, the annular walls *g* and *h*, respectively, of said heads are of different depths, that surrounding the feed-opening being deeper than that surrounding the discharge-opening.

The operation of this cleaning-cylinder is constant and continuous. The nuts or other articles to be cleaned are fed into the end opening *a*, and the rotation of the cylinder carries them around in a continual stream, and gradually carries them along the cylinder toward the discharge end, and when the cylinder is sufficiently filled the nuts commence, by overflow, to discharge over the more shallow wall *h* of the discharging-head through the larger opening *d* thereof. This discharge is continuous with the feed and automatic, being kept up as long as the nuts are fed into the rotating cylinder through the entrance-opening.

The annular wall around the entrance-opening, being deeper than that around the discharge-opening, serves as a guard to prevent the nuts from flying out through the entrance immediately after passing through the same into the cylinder. The construction is therefore such as to enable the cylinder to be fed and emptied while revolving in a continuous manner, and cylinders of various constructions for cleaning different articles may be substituted, these cylinders always, however, having the end-feed opening of less diameter than the overflow-opening in the discharging end.

I am aware that rotary screens having central end feeding and discharging openings are not broadly new, and I do not claim such invention, my claim being confined to cleaning-cylinders which discharge by overflow directly through the central end opening, over an inwardly-directed flange, and having no reference to cylinders in which the discharge is directed to the central opening by falling from the upper part into pockets or directing passages or compartments arranged within the cylinder at its discharge end.

Having thus described my invention, what I claim, and desire to secure by Letters Patent, is—

1. A rotating end-feeding and end-discharging cleaning-cylinder having central feed and discharge-openings, bounded by inwardly-projecting circular end flanges, whereby the material is discharged automatically by overflow at one end thereof, substantially as specified.

2. A cleaning-cylinder having the ends or heads B C, the former provided with a small feed-opening, *a*, and the latter with a large central discharge-opening, *d*, and surrounding said openings, respectively, a deep annular end wall, *g*, and a shallow overflow end wall, *h*, as specified.

3. The combination, with a cylinder having the end bearings *e e*, of the flanged pulleys *c c* and the belts *b b*, substantially as specified.

In testimony that I claim the above I have set my hand and affixed my seal this 21st day of September, 1878.

JOSEE JOHNSON. [L. S.]

In presence of—
GEORGE B. REYNOLDS,
H. C. BULL.